United States Patent [19]

Strickland et al.

[11] 3,957,443

[45] May 18, 1976

[54] FLUID CATALYTIC CRACKING OF HYDROCARBON

[75] Inventors: John C. Strickland; Dorrance P. Bunn, Jr., both of Houston, Tex.

[73] Assignee: Texaco Inc., New York, N.Y.

[22] Filed: Oct. 7, 1974

[21] Appl. No.: 512,748

Related U.S. Application Data

[63] Continuation-in-part of Ser. No. 345,036, March 26, 1973, abandoned.

[52] U.S. Cl. ............................. 23/288 S; 208/153; 208/164
[51] Int. Cl.² ........................ B01J 8/24; C10G 11/18
[58] Field of Search ...................... 23/288 S, 288 E; 208/153, 163, 164

[56] References Cited
UNITED STATES PATENTS

| | | |
|---|---|---|
| 3,188,185 | 6/1965 | Slyngstad et al. .................. 23/288 S |
| 3,243,265 | 3/1966 | Annesser .......................... 23/288 S |
| 3,492,221 | 1/1970 | Pfeiffer .......................... 23/288 SX |
| 3,644,199 | 2/1972 | Evans et al. ..................... 23/288 SX |
| 3,690,841 | 9/1972 | Bunn, Jr. et al. ................. 23/288 S |
| 3,841,843 | 10/1974 | Williams et al. ................. 23/288 S |

*Primary Examiner*—Joseph Scovronek
*Attorney, Agent, or Firm*—T. H. Whaley; C. G. Ries; Douglas H. May, Jr.

[57] ABSTRACT

A transport type fluid catalytic cracking reactor comprising a riser conduit, a flow reversal means and a downcomer conduit, wherein the flow reversal means has a closable top such that a shorter or longer residence time of catalyst and oil vapor in the transport reactor may be selected without affecting vapor velocity within the riser conduit.

7 Claims, 1 Drawing Figure

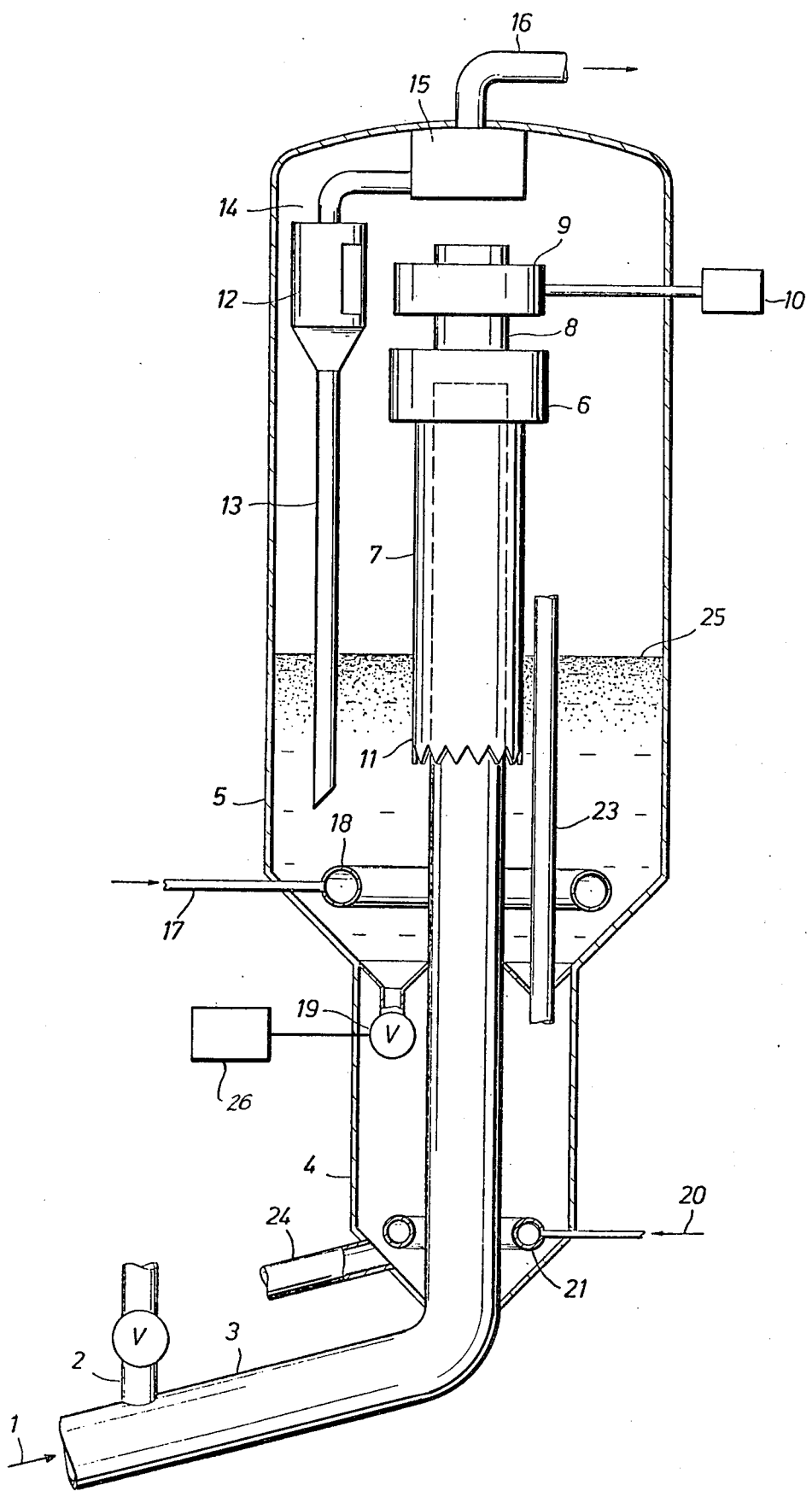

FLUID CATALYTIC CRACKING OF HYDROCARBON

This application is a continuation-in-part of application Ser. No. 345,036, filed Mar. 26, 1973 now abandoned.

BACKGROUND OF THE INVENTION

1. Field of the Invention

The present invention relates to improved process and apparatus for cracking of relatively heavy hydrocarbons, such as gas-oils, into useful lower boiling products. More particularly, the present invention relates to improved process and apparatus for contacting cracking catalyst as a dispersed dilute phase with hydrocarbon vapor in an elongated reaction conduit at flow velocities sufficient to prevent substantial back-mixing of catalyst with additional hydrocarbon vapor.

2. Background of the Invention

In recent years, improved commercial cracking catalysts have been developed which are highly active for conversion of relatively heavy hydrocarbons into naptha, lighter hydrocarbons and coke and demonstrate increased selectivity for conversion of hydrocarbon feed, such as gas-oil, into useful liquid products at the expense of gas and coke. One class of such improved catalytic cracking catalysts includes those comprising zeolitic silica-alumina molecular sieves in admixture with amorphous inorganic oxides such as silica-alumina, silica-magnesia and silica-zirconia. Another class of catalysts having such improved characteristics include those widely known as "high alumina" catalysts. Experience gained from using such improved cracking catalysts have shown that maximum benefits from the high conversion activity and improved product selectivity are obtained by maintaining contact of catalyst and hydrocarbon feed for only a limited time of from 1–10 seconds at cracking conditions wherein catalyst is suspended as a dilute phase in a flowing stream of hydrocarbon vapors. Thus, development of these improved fluid catalytic cracking catalyst has led to utilization of dilute phase transfer line reactors wherein a hydrocarbon cracking reaction is carried out with catalyst dispersed in a hydrocarbon vapor stream moving in an elongated reaction conduit with sufficient velocity to keep the catalyst entrained in such vapor as a dilute phase with a minimum of back mixing. Such dilute phase suspensions of catalyst in hydrocarbon vapor may have a density in the range of from 1 to 10 pounds per cubic foot. Accordingly, residence time flexibility inherent to prior art dense phase fluidized bed reaction zones has been sacrificed for the advantages of improved conversion and product selectivity obtained with transfer line cracking. However, such residence time flexibility is still desirable for controlling product distribution from a fluid catalytic cracking process.

Cyclic processes for fluid catalytic cracking of hydrocarbon feed streams are well known. The fluid cracking process sequence generally comprises contacting hot regenerated catalyst with hydrocarbon feed in a reaction zone under cracking conditions; separating cracked hydrocarbon vapors from used cracking catalyst, stripping volatile hydrocarbons from said used catalyst with a stripping vapor; regenerating stripped catalyst by burning carbonaceous deposits therefrom with oxygen; and then returning regenerated catalyst for reaction with additional hydrocarbon feed. Hydrocarbon vapors from the reaction step and the stripping step are separated into fractions including a gas product, naphtha, light cycle oil and one or more heavier fractions boiling above the light cycle oil range. Such heavier fractions may be withdrawn as product streams from the cracking process, or may, at least in part, be recycled for further cracking. Operating conditions for a fluid catalytic cracking process employing a transfer line reactor having hydrocarbon vapor flowing therethrough with fluidized catalyst dispersed therein as a dilute phase, include regeneration temperatures in the range of about 1,100° to about 1,500°F., regenerator pressure (above the fluidized bed) in the range of about 5–50 psig, transfer line reactor outlet temperatures in the range of 850°–1200°F, preferably 925°–1000°F or higher; reaction zone pressures in the range of 5–50 psig; catalyst to oil weight ratios in the range of 2–20 pounds of catalyst per pound of oil. The cross-sectional area of the transfer line reactor is selected to provide superficial vapor velocities of 15–25 feet per second at the transfer line inlet and of 20–60 feet per second near the outlet. Residence time of reactant vapors in the reaction conduit are preferably in the range of 0.5–10 seconds. Combinations of the above operating conditions may be employed to obtain a hydrocarbon feed conversion in the 60–95 percent range, preferably 75–85%, wherein hydrocarbon feed conversion is defined as that percentage of the hydrocarbon in the feed boiling above about 430°F which is converted to coke and hydrocarbons boiling below 430°F.

At different seasons, it is often desirable to vary product distribution obtained from a fluidized catalytic cracking unit. Particularly, it is often desirable to vary the ratio of naphtha to light cycle gas oil obtained. The degree of conversion, which affects such product ratios, is conveniently controlled by adjusting reaction conditions, particularly residence time of catalyst and hydrocarbon vapor in the reaction zone.

Fluid catalytic cracking apparatus is known which employs transfer line reactors having flow reversal means for dilute phase hydrocarbon cracking processes. For example, see U.S. Pat. No. 3,243,265, Annesser; U.S. Pat. No. 3,492,221, Pfeiffer; and Application, Ser. No. 315,769, filed Dec. 18, 1972, now U.S. Pat. No. 3,841,843, issued Oct. 15, 1974, Williams et al. Such transfer line reactors provide the advantages of dilute phase cracking, and as a result of employing flow reversal means, do not require inordinate vertical heights to provide a desired transfer line length. These transfer line reactor configurations have only limited flexibility of catalyst-hydrocarbon vapor residence time, as the transfer line length is fixed.

Other transfer line reactors are designed to provide flexibility of catalyst-hydrocarbon mixture space velocity under cracking conditions. For example, in U.S. Pat. No. 3,644,199, Evans et al., apparatus and a process are disclosed wherein catalyst-hydrocarbon vapor mixture is admitted into the lower portion of a vertical transfer line reactor comprising an external pipe and an internal concentric pipe open at its lower end and which may be closed at its upper end. The external pipe is fitted with catalyst-hydrocarbon inlet means near its lower end and outlet means near its upper end. The open lower end of the internal concentric pipe terminates above such catalyst-hydrocarbon inlet means and the internal concentric pipe upper end terminates below the closed upper end of the external pipe. Valve means are provided for closing the upper end of the internal concentric pipe in a controllable manner. Superficial flow velocity and residence time of catalyst-hydrocarbon mixture in said transfer line reactor are varied by controlling the degree of closure of the upper end of the internal concentric pipe. That is, with the internal pipe closed, catalyst-hydrocarbon mixture can only flow through the annular area between the external and internal pipes; with the internal pipe open, catalyst-hydrocarbon mixture flows at lower flow velocity and longer residence time through the annular area and the internal pipe. Intermediate velocities and residence times may be obtained by adjusting the degree of closure of the inner concentric pipe. The disadvantage of this apparatus is that velocity of the catalyst-hydrocarbon mixture varies with the degree of closure of the inner concentric pipe. Such changes in flow velocity affect the density of the catalyst-hydrocarbon mixture and consequently, the catalyst to oil ratio which affects conversion and selectivity of the cracking reaction. Under certain flow conditions, substantial backmixing of catalyst in the hydrocarbon vapor stream will occur, leading to undesired loss in naphtha selectivity and increase in coke production.

SUMMARY OF THE INVENTION

Now, according to the present invention, an apparatus for dilute phase catalytic cracking of hydrocarbons is disclosed for use in a Fluid Catalytic Cracking System. Such apparatus includes an improved elongated, confined transport reaction zone for passing a mixture of hydrocarbon vapors and catalyst therethrough. Such elongated confined transport reaction zone comprises a substantially vertical riser conduit; flow reversal means attached to the upper end of said riser having an open lower end and a closable upper end for changing the direction of flow of hydrocarbon vapor-catalyst mixture exiting the riser conduit; valve means for closing the upper end of said flow reversal means; a substantially vertical downcomer forming an annulus around said riser conduit for receiving catalyst-hydrocarbon mixture from said flow reversal means and discharging into a reaction vessel; and means for closing the downcomer discharge.

By employing the apparatus of the present invention, an elongated, confined transport reaction zone is provided for a dilute phase hydrocarbon cracking reaction zone that is compact, having a reduced vertical height, and which by selecting an open or closed position for the valve in communcation with said flow reversal means, is of variable length. Residence time of catalyst-hydrocarbon mixtures may conveniently be varied by opening and closing said valve without affecting flow velocity within the riser conduit. Thus, degree of conversion of hydrocarbon may be varied by proper selection of residence time and other operating variables without affecting catalyst-hydrocarbon mixture flow velocity, and catalyst hold-up and catalyst backmixing in the transfer line. The elongated confined reaction zone of the present invention is useful in construction of new fluid catalytic cracking units, as the overall vertical height of the cracking unit may be substantially reduced while maintaining the desired length of transport reaction zone. Additionally, the transport reaction zone of the present invention is particularly useful in modifying existing fluid catalytic cracking units wherein additional length of reaction zone may be added to an existing riser without consuming appreciable space in an existing reaction vessel. These and other advantages of the present invention will be described more fully in the detailed description which follows.

BRIEF DESCRIPTION OF THE DRAWINGS

The drawing is a schematic sectional view of the reaction section of a fluidized catalytic cracking unit showing the elongated transport reaction zone of the present invention in relation to other elements of the fluid cracking reaction section.

DETAILED DESCRIPTION OF THE INVENTION

In a hydrocarbon converison process employing a fluidized catalyst-hydrocarbon dispersion in a vertical transport reactor, the degree of hydrocarbon conversion may be varied by a controlled change in residence time of the catalyst-hydrocarbon dispersion within the transport reactor under reaction conditions.

This invention may be employed with any catalytic hydrocarbon conversion process utilizing a fluidized reactor system of the transport type wherein such system requires cycling of catalyst to the reactor following suitable stripping and regeneration. This invention is particularly adaptable to the catalytic cracking of petroleum fractions, and the following description will be in terms thereof.

In the present invention an improved elongated, confined transport reaction zone is provided for use in a fluidized catalytic cracking unit which transport reaction zone is designed for an extended period of contact between catalyst and hydrocarbon feed vapors at cracking conditions and under conditions wherein the catalyst is suspended as a dilute phase in the flowing hydrocarbon vapors. Additionally, by opening the valve means in communication with the flow reversal means, residence time of catalyst and hydrocarbon feed vapors in the transport reaction zone may be substantially reduced without affecting other operating conditions, particularly flow velocity and catalyst density in the transport reaction zone. The design is such that the transport reaction zone of the present invention is of reduced vertical height and occupies minimum lateral area.

The transport reaction zone of the present invention comprises a riser portion having, at the lower end thereof, means for introducing hydrocarbon feed and means for introducing hot, regenerated catalyst; flow reversal means located at the upper, discharge end of said riser portion for reversing the direction of flow of the catalyst-hydrocarbon vapor mixture; valve means in communication with said flow reversal means which, when open, alternatively allow the catalyst-hydrocarbon vapor mixture to enter the reaction vessel directly from the riser; and a down-comer portion which receives catalyst-hydrocarbon vapor mixture from said flow reversal means in cases where said valve means are closed. Said downcomer portion surrounds said riser portion, forming an annular space for continued contact of catalyst and hydrocarbon vapor under dilute cracking conditions.

Utilization, in a first operating mode with the valve means closed, of the improved transfer line reactor of the present invention within a fluid catalytic cracking system is such that hot regenerated catalyst from a regeneration zone is combined with hydrocarbon feed in the lower end of the riser portion of said transport reactor and the catalyst-hydrocarbon vapor mixture discharges from the outlet of the downcomer portion of said conduit into the reaction vessel. In such reaction vessel, catalyst and hydrocarbon vapors disengage. The hydrocarbon vapors, substantially free of catalyst, are transferred to fractionation means for recovery of desired products. Catalyst in the reaction vessel is maintained as a fluidized dense phase bed for subsequent transfer to a stripping zone and a regeneration zone. The outlet of the downcomer portion of the conduit may discharge the catalyst hydrocarbon vapor mixture either above or below the surface of said fluidized dense phase catalyst bed maintained in the reactor vessel. Within contemplation of the present invention, means are provided for adjusting the dense phase bed height to selectively cover or uncover the open bottom of said downcomer. Such bed adjusting means may include controlled valve means communicating between said reactor vessel and the catalyst stripper which may be operated to increase or decrease flow of dense phase catalyst from said reactor vessel to the stripper, thus decreasing or increasing the dense phase bed height. Other means for controllably adjusting the dense phase bed height may be employed within the contemplation of the present invention. In this first operating mode, should it be desirable to obtain further cracking of hydrocarbon vapors over that experienced in the transfer line conduit, then the dense phase catalyst bed may be increased to position the downcomer outlet below the surface of said fluidized dense phase catalyst bed, and the hydrocarbon vapors exiting the downcomer will undergo additional contact with the catalyst. On the other hand, should it be desirable to limit cracking substantially to that experienced in the riser and downcomer, then the dense phase catalyst bed may be decreased such that the downcomer outlet is above the surface of said dense phase bed and hydrocarbon vapor disengages the catalyst above the dense phase bed and contact is limited substantially to that within the riser and downcomer.

In a second operating mode, with the valve means open, utilization of the improved transfer line reactor of the present invention within a fluid catalytic cracking system is such that the catalyst-hydrocarbon vapor mixture discharges from the outlet of the riser, through the open valve means directly into the reactor vessel. In the reactor vessel, catalyst and hydrocarbon vapor disengage. The dense phase catalyst bed, in this second mode of operation, is increased to cover the downcomer outlet, thus forming a fluid seal. With the downcomer outlet so sealed, the catalyst-hydrocarbon vapor mixtures exiting the riser outlet passes into the reactor vessel through the open valve means and does not flow through the downcomer. In this second operating mode, contact of catalyst and hydrocarbon vapor in the transfer line reactor is substantially shortened and conversion of hydrocarbon is decreased over conversion experienced in the first operating mode.

Thus, by employing the improved transport reactor of the present invention, substantial flexibility of cracking conditions may be obtained without varying temperatures, pressures, flow rates, catalyst to oil ratios and other operating variables in the dilute phase transport reactor. If desired, however, other operating variables may be changed, as well as the operating mode of the transport reactor, in order to obtain the desired degree of hydrocarbon cracking.

The attached drawing is a schematic representation of the reactor section of a fluidized catalytic cracking unit showing the improved transport reactor conduit of the present invention in relation to other elements of the reaction section. Many elements commonly employed in a commercial fluidized cracking unit, but which are unnecessary to show the invention herein, have been omitted for the sake of clarity. Such omitted elements may readily be supplied by one skilled in the art. It is to be understood that the drawing and the description which follows are for the purpose of illustration only and are not intended as limitations upon the present invention. Other embodiments of the present invention coming within the scope of the appended claims will be obvious to those skilled in the art.

In the drawing the transport reactor comprises riser conduit 3, flow reversal means 6, and downcomer 7. Riser conduit 3 has hydrocarbon inlet 1 and a regenerated catalyst inlet 2 at the lower end thereof. Riser conduit 3 extends vertically upward through stripping section 4 into reactor vessel 5 wherein the upper end of riser conduit 3 terminates within the hollow cylindrical body of flow reversal means 6. An upper portion of riser conduit 3 extending into reactor vessel 5 is surrounded by downcomer conduit 7, as will hereinafter be described.

Flow reversal means 6 comprises a vertical, hollow cylinder having a top and bottom. Attached to the top of flow reversal means 6 is outlet nipple 8 which is coaxial with, and at least the same diameter as riser conduit 3. Downcomer 7 is attached to the bottom of flow reversal means 6 and is concentric with riser conduit 3. Riser conduit 3 terminates below the top of flow reversal means 6 by a distance at least equal to one-fourth the diameter of riser conduit 3. Preferably riser conduit 3 extends above the bottom of flow reversal means 6 by a distance equal to one-fourth the diameter of riser conduit 3, although this last dimension is not critical for the present invention.

Valve means 9 is mounted above nipple 8 such that, when valve means 9 is open, communication is established between the outlet of riser 3 and the interior of reactor vessel 5 via nipple 8 and open valve means 9. Activation means 10, mounted externally to reactor vessel 5 is attached such that opening and closing of valve means 9 may be effected from a position external to reactor vessel 5. Valve means 9 may be any convenient valving arrangement, preferably a slide valve.

Downcomer conduit 7 is of a diameter such that the cross sectional area of the annular space between downcomer 7 and riser conduit 3 is at least equal to the internal cross-sectional area of riser conduit 3, and preferably the annular cross-section area is about twice the cross-section area of riser conduit 3.

The diameter of flow reversal means 6 is at least as large as the diameter of downcomer conduit 7, and preferably is such that the distance from the cylinder wall of flow reversal means 6 to the wall of downcomer conduit 7 is at least equal to the distance from downcomer conduit 7 to riser conduit 3, although such dimension is not critical to the present invention.

The preferred dimensions given for spacing between riser conduit 3, downcomer conduit 7 and flow reversal means 6 have been selected such that excessively high vapor velocities do not occur within the interior of flow reversal means 6. Flow reversal means 6 is positioned such that the top and bottom thereof are perpendicular to the flow of catalyst and hydrocarbon in riser conduit 3, and the cylinder wall of flow reversal means 6 is perpendicular to its top and bottom. In this manner, a substantial portion of high velocity catalyst particles pass upwardly from riser conduit 3 and enter outlet nipple 8. If valve means 9 is in an open position, catalyst and hydrocarbon vapor pass through into reactor vessel 5. If closed, a relatively dead space is formed in outlet nipple 8 in which vapor velocities are quite low such that catalyst particles may accumulate and thereby form a cushion to protect valve means 9 from erosion by impingement of additional high velocity catalyst particles. With outlet nipple 8 closed, vapors from riser conduit 3 are forced into the body of flow reversal means 6 from which they then flow into the annular space between riser conduit 3 and downcomer 7. The volume and cross-section area of flow reversal means 6 are sufficiently large to avoid excessively high vapor velocities therein. Catalyst particles and vapor which have lost their vertical component of velocity in flow reversal means 6 pass from above the outlet of riser conduit 3 and strike the cylinder wall of flow reversal means 6 at an angle of about 90°. Minimum erosion of a surface occurs when the impingement angle of catalyst particles is about 90°. Catalyst and hydrocarbon vapor from flow reversal means 6 passes into the annular space between downcomer 7 and riser conduit 3. From the lower end of downcomer 7, catalyst and hydrocarbon vapors are discharged into reactor vessel 5. The lower end of downcomer 7 terminates in a plurality of evenly spaced distribution deflectors 11 which comprise triangular shaped extension to downcomer 7 and which define a plurality of V-shaped notches in the bottom edge of downcomer 7. Catalyst particles flowing downwardly in downcomer 7 have a momentum component which tends to continue their downward direction while the hydrocarbon vapor tends to flow outward through the V-shaped notches. Thus separation of hydrocarbon vapor from catalyst is enhanced.

The diameter and length of riser conduit 3 and downcomer 7 are selected such that the residence time of a catalyst-hydrocarbon mixture at reaction temperatures and pressures is in the range of from about 0.5–10 seconds, and preferably 2–6 seconds, at superficial vapor velocities in the range of 10–60 feet per second. Preferably, the diameter and length of downcomer 7 is selected such that it accounts for between one-third and one-half of the residence time of the catalyst-hydrocarbon mixture. In this situation, a substantial decrease in residence time may be obtained by opening valve means 9, thus allowing the catalyst-hydrocarbon mixture to bypass downcomer 7 and providing greater flexibility to a fluid catalytic cracking system.

In operation, preheated hydrocarbon feed from line 1 and hot regenerated catalyst from line 2 enter the lower end of riser conduit 3 wherein the catalyst is suspended as a dilute phase in a flowing hydrocarbon vapor stream. The hydrocarbon vapor-catalyst mixture, having a superficial velocity in the range of 10–60 feet per second flows upward through riser conduit 3 under cracking conditions including transport reactor outlet temperatures in the range of 800°–1200°F., preferably 925°–1100°F, catalyst to oil weight ratio of 2–20/1, and pressure in the range of 5–55 psig.

In the first operational mode with valve means 9 closed, the hydrocarbon vapor-catalyst mixture discharges from riser conduit 3 into flow reversal means 6. In flow reversal means 6, the flow direction of the hydrocarbon vapor-catalyst mixture is reversed 180°. From flow reversal means 6, the hydrocarbon vapor-catalyst mixture enters downcomer 7 from which the mixture discharges into reaction vessel 5. In this mode of operation, hydrocarbon vapor and catalyst are maintained in contact under dilute phase cracking conditions for a relatively longer time within the 0.5–10 second residence time range, thus the hydrocarbon undergoes a relatively large degree of conversion. In the drawing, the lower end of downcomer 7 is shown located below the upper surface 25 of a fluidized dense phase bed of catalytic cracking catalyst. Hydrocarbon vapors leaving downcomer 7 thus pass upwardly through the fluidized catalyst bed and disengage the fluidized bed at its upper surface 25. Under such operating conditions, hydrocarbon vapors leaving downcomer 5 are subjected to additional cracking within the dense phase fluidized catalyst bed. If it is determined that hydrocarbon cracking be limited to dilute phase catalyst cracking, the inventory of fluidized catalyst within reaction vessel 5 may be reduced such that the upper surface of the fluidized dense phase catalyst bed is below the lower end of downcomer 7.

In the second operational mode, with valve means 9 open, it is preferable that the upper surface 25 of the dense phase fluidized catalyst bed be above the lower end of downcomer 7 sufficiently to form a fluid seal which will prevent any substantial flow through downcomer 7. The hydrocarbon vapor-catalyst mixture flowing from the upper end of riser conduit 3 enters outlet nipple 8 and flows through valve means 9 into reactor vessel 5. In reactor vessel 5, the superficial vapor velocity decreases substantially and catalyst particles fall into the fluidized catalyst bed, thus separating from hydrocarbon vapors which flow upward. In this mode of operation, the reaction path under dilute phase conditions is shortened, as downcomer 7 is bypassed. Consequently, the residence time of the hydrocarbon vapor-catalyst mixture is likewise shortened. By this means, the degree of hydrocarbon conversion is decreased while maintaining vapor velocities in riser conduit 3 at a rate sufficient to maintain the dilute phase suspension of catalyst in hydrocarbon vapor with substantially no backmixing.

For operation either with valve means 9 open or closed, hydrocarbon vapors above fluidized bed surface 25 flow into cyclone separator 12 for separation of any entrained catalyst therefrom. Separated catalyst from cyclone separator 12 is returned to the fluidized bed via dip leg 13 and hydrocarbon vapors substantially free of catalyst are passed via line 14 into plenum 15. It is to be understood that cyclone separator 12 as shown is representational only, and such separator may comprise a plurality of such cyclone separators in series and paralleled configuration as required to give substantially complete separation of hydrocarbon vapors from entrained catalyst.

From plenum 15, hydrocarbon vapors pass via line 16 to product separation facilities, not shown, wherein the cracked hydrocarbon vapors are separated into product fractions including a gas fraction, a naphtha fraction, a light cycle oil fraction, and one or more fractions higher boiling than light cycle oil. Such higher boiling fractions may be recovered as products of the process or may be recycled, in whole or in part, to the fluid cracking process for additional conversion.

Steam from line 17 enters primary steam ring 18 from which it passes into the fluidized catalyst bed. Steam from the primary steam ring serves to maintain the fluidized state of the dense phase catalyst bed and in addition strips a substantial portion of volatile hydrocarbons from the spent catalyst contained within the fluidized bed.

From reactor vessel 5, dense phase catalyst passes through slide valve 19 into stripping section 4. The rate of flow of catalyst into stripping section 4 is determined by the degree of opening of slide valve 19. The degree of opening of slide valve 19 is adjusted by controller 26 mounted externally of stripping section 4. The height of the upper surface 25 of the dense phase catalyst bed is adjusted by allowing more or less catalyst to flow through slide valve 19. Thus, by operating controller 26 to adjust the degree of opening of slide valve 19, the height of the upper surface of the dense phase catalyst bed may be changed to selectively cover and uncover the bottom opening of downcomer 7 as desired for the first operational mode or the second operational mode, as described hereinabove. The actual height of the upper surface 5 of the dense phase bed may be determined using sensing devices well known in the art, such as differential pressure indicators, etc. In stripping zone 4, steam from line 20 enters steam ring 21 from which the steam is distributed into the lower portion of stripping zone 4. Thus, additional volatile hydrocarbons are stripped from the spent catalyst entering through slide valve 19. Stripping effluent vapor comprising steam and hydrocarbon passes from stripper 4 via stripper vent line 23 into reactor vessel 5 wherein such stripping vapors are released above the upper surface 25 of the fluidized catalyst bed. Stripped catalyst from stripping section 4 is withdrawn via line 24 and transferred to a regeneration zone, not shown. In the regeneration zone, stripped catalyst containing non volatile carbonaceous deposits, e.g. coke, is regenerated by burning such carbonaceous deposits with an oxygen containing gas, such as air. Regenerated catalyst from the regeneration zone is returned via line 2 to the lower portion of riser conduit 3 for contact with additional hydrocarbon feed, as hereinabove described.

The transport reactor contemplated herein comprising riser conduit 3, flow reversal means 6, valve means 9, and downcomer conduit 7, may be completely or partially contained within fluidized cracking reaction vessel 5, which serves as a zone for further cracking of hydrocarbons and/or as a catalyst-hydrocarbon vapor disengaging zone. The transport reactor of the present invention is particularly useful where it is desired to convert an existing fluidized catalytic cracking unit into one which utilizes dilute phase cracking of hydrocarbons and wherein it is desired to limit modifications of the cracking unit to the reaction side and wherein the reactor vessel is already in existence.

In flowing streams comprising hydrocarbon vapors and catalyst particles wherein the velocity is sufficient to maintain the catalyst particles suspended as a dilute phase, erosion of transport reactor interior surfaces must be considered. The maximum potential for erosion occurs within the flow reversal means 6 of the transport reactor zone of the present invention. In flow reversal means 6, catalyst particles exiting riser conduit 3 impinge directly upon the top of flow reversal means 6 and the face of valve means 9. It has been observed that erosion by impingement of catalyst particles may be substantially reduced when the angle of impingement is about 90° to the surface being impinged. Consequently, for the first operational mode, with valve means 9 closed, flow reversal means 6 and valve means 9 are designed such that catalyst impingement upon the interior surfaces thereof is maintained at about 90° throughout the process of the reversing the direction of flow of the catalyst-hydrocarbon vapor mixture. For the second operating mode, with valve means 9 open, the catalyst-hydrocarbon vapor mixture passes upward from the outlet of riser 3 through flow reversal means 6 and open valve means 9 without substantial impingement of catalyst upon interior surfaces.

It has been noted that erosion of surfaces by impingement of catalyst particles may be substantially reduced by employing a refractory lining upon the surface being impinged. Consequently, it is within the contemplation of this invention that the interior surfaces of the transport reactor, flow reversal means 6 and valve means 9 be covered by a refractory material according to methods well known in the art of constructing fluidized catalytic cracking units.

In the practice of the present invention, suitable hydrocarbon charge stocks to the fluidized conversion reaction include virgin atmospheric gas-oils, vacuum gas-oils, heavy naphthas, deasphalted oil, residual fractions, shale oils and cycle oils derived from any of these. Such hydrocarbon charge stocks may be employed singly or in combination.

Suitable catalysts include those comprising refractory metal oxides having hydrocarbon conversion activity and which may be effectively regenerated under the selected conditions. Examples of catalyst include silica-alumina, silica-magnesia, and silica zirconia. With particular regard to catalytic cracking, preferred catalysts include those combinations of silica-alumina containing 10–50 weight percent alumina, and their admixtures with crystalline zeolitic alumino-silicates commonly known as "molecular sieves". Suitable molecular sieves include both naturally occurring and synthetic alumino silicates such as faujasite, chabozite, X-type and Y-type alumino-silicate molecular sieves. The alkali metal ions of such molecuar sieves are exchanged in large parts for ammonium, hydrogen, divalent metal, or rare earth metal ions by known techniques so that the sodium ion content is less than about 1.0 weight percent.

The process arrangement disclosed herein is effective for varying the degree of cracking of a selected feedstock, and also affords a degree of flexibility when employing segregated feedstocks exhibiting different susceptibilities to catalytic cracking. This process scheme is also useful where either fresh feed rate or through put rate may vary significantly at intervals and a substantially constant degree of conversion is desired.

The following examples are illustrative of the present invention but are not intended as limitations on its reasonable scope.

EXAMPLE I

In a Fluid Catalytic Cracking System similar to that shown in the drawing, a virgin gas oil, derived from West Texas Sour Crude, along with 20 volume percent heavy cycle gas-oil recycle is cracked under dilute phase conditions. In this example, valve means 9 is closed, and the upper surface 25 of the dense phase catalyst bed is below downcomer 7 outlet such that substantially no bed cracking occurs. The oil is pumped via line 1 into the lower end of vertical riser 3 and hot, regenerated silica-alumina molecular sieve cracking catalyst from line 2 is mixed therewith to provide a dilute phase dispersion of catalyst in hydrocarbon vapor. The catalyst-hydrocarbon vapor mixture, at a velocity of 30 feet per second exits vertical riser 3 into flow reversal means 6. As valve means 9 is closed, the catalyst-hydrocarbon vapor mixture flows into downcomer 7 having a volume equal to one-half the volume of riser conduit 3. At a final velocity of 15 feet per second, a temperature of 960°F, and an apparent space velocity of 4.0 volumes virgin gas-oil per hour per volume of transport reactor, the catalyst-hydrocarbon vapor mixture discharges from downcomer 7 into reactor vessel 5 in which the catalyst is separated from the hydrocarbon vapor. Hydrocarbon vapor is recovered overhead from reactor vessel 5 via line 16 and is fractionated into product fractions. Gas oil conversion is 80 volume percent of the feed and naphtha yield is 62 volume percent.

EXAMPLE II

The process of Example 1 is repeated, except valve means 9 is open and the upper surface 25 of the dense phase bed is above the outlet of downcomer 7, forming a fluid seal such that the dispersed phase does not pass through downcomer 7. Thus, at an apparent velocity of 30 feet per second, a temperature of 960°F. and apparent space velocity of 6.0 volumes of virgin gas-oil per hour per volume of transport reactor, the dilute phase catalyst-hydrocarbon vapor dispersion exits the top of flow reversal means 6 through open valve means 1 into reactor vessel 5 for separation of catalyst from hydrocarbon vapor. Hydrocarbon vapor, free of catalyst is recovered overhead from reactor vessel 5 via line 16 and is fractionated into product fractions. Gas-oil conversion is 60 volume percent and naphtha yield is 50 volume percent.

Thus it can be seen from the examples, by employing the apparatus of the present invention, in the first operational mode, and the second operational mode, as described herein, conversion of gas-oil may be varied in a controlled manner to vary the amount of naphtha produced. Velocities in the dilute phase transfer line reactor in either mode of operation are sufficient to prevent backmixing of catalyst with additional hydrocarbon, thus maintaining the desirable catalyst conversion and selectivity characteristics obtained in a dilute phase from transport reactor process.

From the above it can be seen that an improved transport reactor has been disclosed for use in a fluidized catalytic cracking unit, which reactor is simple in construction, is of reduced elevation, and occupies a minimum amount of space. The above description of the improved reactor is for a preferred embodiment thereof and many changes and modifications which are within the spirt and scope of the present invention will be obvious to those skilled in the art. Therefore, no limitation upon the improved transport reactor of the present invention is intended other than limitations contained in the appended claims.

We claim:

1. In a fluidized catalytic cracking vessel comprising an enclosed, vertical shell defining a lower zone for a dense phase fluidized catalyst bed and an upper zone for separation and recovery of hydrocarbon vapors, an elongated riser conduit extending vertically into the lower portion of said reactor vessel forming an upwardly directed confined cracking path, an elongated downcomer, open at each end, vertically disposed around the upper portion of said elongated riser conduit forming a downwardly directed annular cracking path communicating at the lower end with the interior of said reactor vessel, and flow reversal means communicating with the interior of said riser conduit and the annular space between said riser conduit and said downcomer at the upper end thereof; the improvement which comprises:
 a. valve means, having full open and full closed positions coaxial with the upper end of said riser conduit and communicating between the flow reveral means and the reactor vessel for selectively lengthening and shortening the confined cracking path;
 b. means for reducing erosion of said valve means by impinging catalyst comprising a nipple having a diameter at least equal to the diameter of said riser conduit and having a height at least equal to one-fourth its diameter, said nipple being coaxial with the riser conduit outlet and attached to the top of said flow reversal means and the bottom of said valve means; and
 c. dense phase fluidized catalyst bed level adjusting means for selectively covering and uncovering said downcomer outlet with accumulated dense phase fluidized catalytic cracking catalyst.

2. The apparatus of claim 1 including valve control means mounted externally of said reactor vessel and connected to said valve means, for opening and closing said valve means.

3. Cyclic fluid catalytic cracking apparatus comprising in combination a transport reaction zone, a cylindrical reactor vessel, spent catalyst stripping means, catalyst regeneration means in communication with said stripping means, and product recovery means in communication with said cylindrical reactor vessel, including:
 a. an elongated, vertical riser having, at the lower end, regenerated catalyst inlet means in communication with said regeneration means and hydrocarbon inlet means and having an open upper end terminating within said reactor vessel, forming a portion of said transport reaction zone;
 b. flow reversal means concentric with the open upper end of said riser for receiving hydrocarbon vapor-catalyst mixture from said riser;
 c. valve means, having full open and full closed positions, communicating between the top of said flow reversal means and said reactor vessel and coaxial with said riser outlet for selectively lengthening and shortening said vertical transport zone;
 d. means for reducing erosion of said valve means by impinging catalyst comprising a nipple having a diameter at least equal to the diameter of said riser conduit and having a height at least equal to one-fourth its diameter, said nipple being coaxial with the riser conduit outlet and attached to the top of said flow reversal means and the bottom of said slide valve means;
 e. a vertical downcomer having an open upper end attached to the lower end of said flow reversal means and having an open lower end in communication with the interior of said reactor vessel, concentric with said riser, forming an annular portion of said transport reaction zone;
 f. dense phase fluidized catalyst bed level adjusting means for selectively covering and uncovering said downcomer outlet with accumulated dense phase fluidized catalyst maintained in said reactor vessel.

4. The apparatus of claim 3 including valve control means mounted externally of said reactor vessel and connected to said valve means for opening and closing said valve means.

5. The apparatus of claim 4 wherein said flow reversal means comprises a vertical hollow cylinder, having a top and bottom, said cylinder concentric with the upper end of said riser; wherein said means for reducing erosion of said valve means comprises a nipple having a diameter at least equal to the diameter of said riser and having a height at least equal to one-fourth the diameter, said nipple being coaxial with said riser conduit and attached to the top of said flow reversal means and the bottom of said valve means.

6. The apparatus of claim 5 wherein the annular space formed between said downcomer and said riser has an annular cross sectional area of from about equal to about twice the riser cross sectional area; and wherein the volume of the annular space is from about one-third to about one-half the total volume of the transport reactor.

7. The apparatus of claim 6, wherein the valve means of (c) comprises a slide valve.

* * * * *